UNITED STATES PATENT OFFICE.

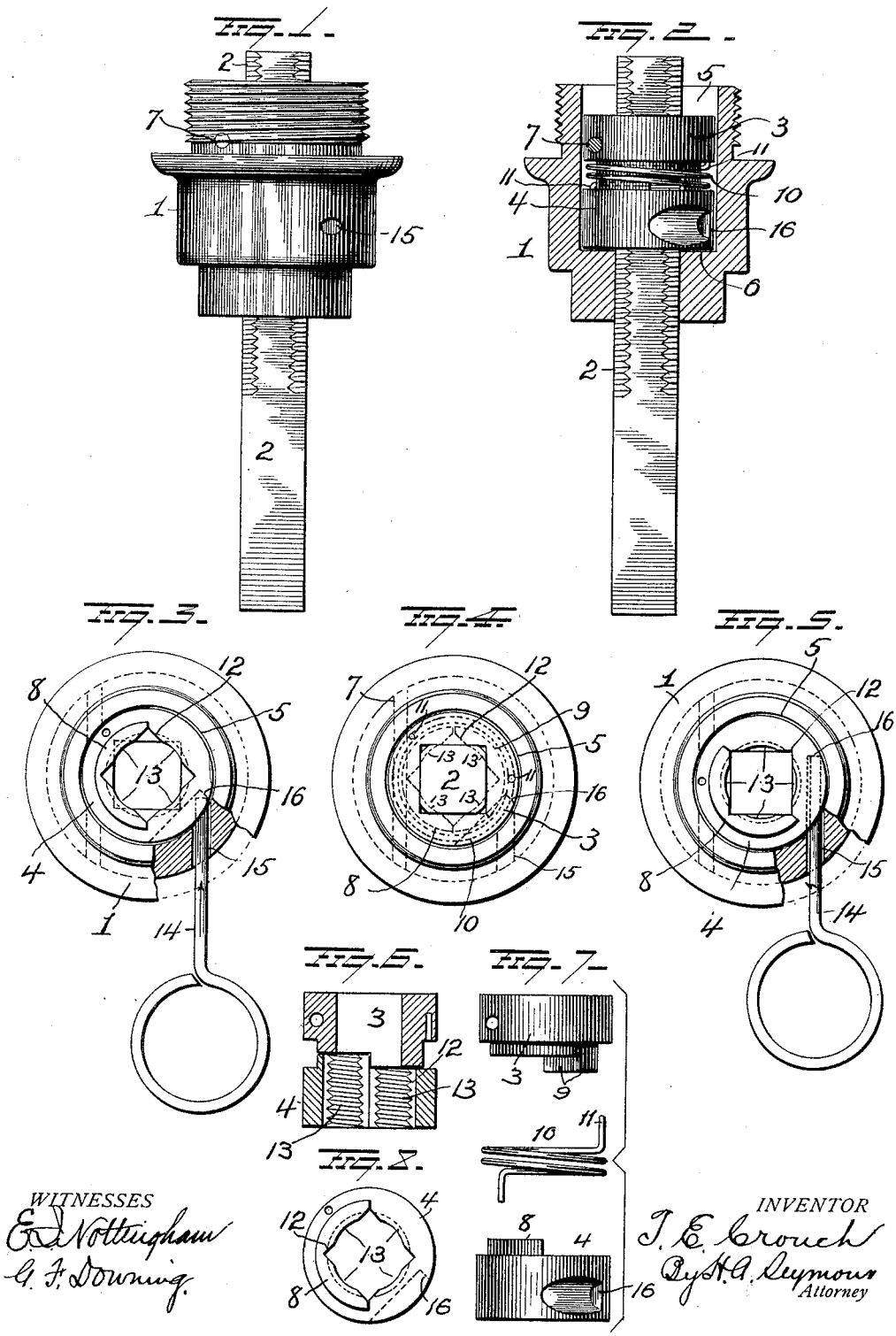

THOMAS E. CROUCH, OF STAMFORD, CONNECTICUT, ASSIGNOR TO THE YALE & TOWNE MANUFACTURING COMPANY, OF STAMFORD, CONNECTICUT.

KNOB-SHANK FASTENER.

1,084,316.   Specification of Letters Patent.   Patented Jan. 13, 1914.

Application filed April 9, 1913. Serial No. 759,965.

*To all whom it may concern:*

Be it known that I, THOMAS E. CROUCH, of Stamford, in the county of Fairfield and State of Connecticut, have invented certain new and useful Improvements in Knob-Shank Fasteners; and I do hereby declare the following to be a full, clear, and exact description of the invention, such as will enable others skilled in the art to which it appertains to make and use the same.

My invention relates to an improvement in means for securing knobs to spindles, and it consists in the parts and combination of parts as will be more fully explained and pointed out in the claims.

In the accompanying drawings, Figure 1 is a view in elevation of a knob shank and spindle embodying my invention; Fig. 2 is a view in section of the shank showing my improvement in elevation; Fig. 3 is a view in end elevation of the shank with the bushing and spring removed, the revolving locking sleeve being in its locking position; Fig. 4 is a similar view with the bushing in place; Fig. 5 is a view partly in section showing the unlocking tool inserted; Fig. 6 is a view in elevation, partly in section, of the bushing, and revolving locking sleeve, the parts being in their proper relative positions; Fig. 7 is a view showing these parts and also the spring detached, and Fig. 8 is a view in end elevation of the revolving locking sleeve.

1 represents the knob shank, provided at one end with an angular opening for the passage of the knob spindle 2, and counterbored at its opposite end as at 5, the counterbore or pocket being cylindrical and of a size to receive the bushing 3 and locking sleeve 4, both of which have openings through same, for the passage of the angular spindle 2. The bushing and sleeve are cylindrical and closely fit within the cylindrical bore 5 of the shank 1, and the locking sleeve 4, rests against the internal shoulder 6, integral with the shank 1, and is held from outward displacement, or from movement in the direction of the length of the shank, by the bushing 3, which is locked to the shank 1 by the pin 7. This pin is passed through alined holes in the shank and bushing, and is cut off at its ends to conform to the outer curvature of the shank, and when the parts are assembled, the ends of the pin are covered and concealed by the knob, which prevents the displacement of the pin.

The sleeve 4 is mounted to rotate within the shank, and is provided on its end adjacent the bushing 3 with a projecting shoulder 8, which latter is in the plane of the shoulder 9 on the bushing 3, so as to limit the rotation of the sleeve, the shoulders 8 and 9, being so located with relation to each other, that when the sleeve comes to a rest with its shoulder 8 against shoulder 9, it will be in its locking position.

Located intermediate the sleeve and bushing is the spring 10, the bent ends 11 of which are inserted in holes in the bushing and sleeve respectively, the spring being under tension when applied to said parts, so as to normally hold the shoulder on the locking sleeve in yielding contact with the shoulder on the bushing.

The spindle 2 is threaded at its four corners or angles, and the locking sleeve 4 is provided with an angular opening 12 slightly larger than the spindle for the free passage of the latter when the sleeve is turned to bring its opening into alinement with the openings in the bushing and shank, and is provided intermediate its corners or angles, with threaded sections 13, which, when the locking sleeve is in normal position, or position of rest, engages the threads of the spindle and locks the latter against the possibility of accidental displacement, or against removal, except by one who is familiar with the construction of the parts. This mechanism is applied to the inner knob so that the knobs and spindle cannot be removed from the outside even by one familiar with the construction.

When the locking sleeve 4 is in its normal position, the spindle 2 cannot either be inserted or removed from the shank, for the reason, that the four corners or angles of the opening in the locking sleeve, are in planes intermediate the corners or angles of the opening in the bushing, as shown in Fig. 3, and the threaded sections 13 of the locking sleeve are in the planes of the corners of the opening through the bushing, hence in order to insert the spindle in the shank, the locking sleeve must be turned until its four corners aline with the four corners of the opening through the bushing, the opposite ends of the shoulders 8 and 9 limiting the rotation of the sleeve 4 in this direction. The sleeve is turned by a removable pin 14, passed through a hole 15 in the shank and abutting against a shoulder 16 on the sleeve 4. By now pressing on the pin the sleeve will be turned as above explained, and when so turned the spindle may be freely entered into the shank and adjusted to the door, and by releasing and withdrawing the pin the sleeve 4 will rotate under the action of its spring, and thus cause its threaded section 13 to engage the threaded corners of the spindle and lock the same against the possibility of accidental displacement. In order to release the spindle, the sleeve 4 is turned by a pin 14 in a direction to compress the spring 10, which disengages the threads on the sleeve from the threads on the corners of the spindle, thus leaving the latter free to be withdrawn.

By this construction, the parts can be minutely adjusted to a door, and when the sleeve is released from the pin the spindle will be positively and securely locked to the shank.

While I have referred to the spindle and sleeve as being threaded for engagement with each other, I would have it understood that I do not limit myself to screw threads, as projections of any kind on the spindle that will engage with projections in the sleeve, and operate to lock the two parts together, are intended to be comprehended by the claims.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a knob shank fastener, the combination of an angular spindle having notched corners, a knob shank having an angular opening conforming in size and shape to the spindle, and a movable spring controlled sleeve carried by the shank and provided internally with projections, which when the sleeve is in its normal position engage the notches in the spindle and lock the latter to the shank, and which may be disengaged from said notches by turning said spring controlled sleeve in a direction to compress the spring.

2. In a knob shank fastener, the combination of an angular spindle having notched corners, a knob shank having an opening conforming in shape and size to the spindle, a bushing located in a pocket in said shank, a spring actuated sleeve adapted to have a part rotary movement, also located within said pocket, the said bushing and sleeve each having an angular opening for the passage of the spindle, and the sleeve also having projections intermediate the corners of its angular opening, whereby when the sleeve is in its normal position, the projections thereon interlock with the notches on the corners of the spindle and lock the latter in place.

3. In a knob shank fastener, the combination of an angular spindle having threaded corners, a knob shank, a bushing secured in a pocket in the shank and provided with an angular opening conforming in size and shape to the cross section of the spindle, a sleeve having a rotary movement in the pocket of the shank and provided with an angular opening for the passage of the spindle and with a threaded section intermediate two of the angles or corners of the spindle opening, means for limiting the rotary movement of the sleeve, a spring for yieldingly holding the sleeve in its locking position with relation to the spindle, and an opening through the shank for the introduction of a tool whereby the sleeve may be turned to release, or permit of the entrance of the spindle.

4. In a knob shank fastener, a spindle having projections thereon, a shank having an angular opening at one end conforming in size and shape to the spindle, a bushing detachably secured within the pocket of the shank, a sleeve mounted to partly rotate within said pocket, the said sleeve and bushing each having an angular opening for the passage of the spindle and the sleeve having threads intermediate two of its corners or angles, means for limiting the rotary movement of the sleeve and means for yieldingly holding same in a position where its threads will engage the projections on the spindle.

In testimony whereof, I have signed this specification in the presence of two subscribing witnesses.

THOMAS E. CROUCH.

Witnesses:
 SCHUYLER MERRITT,
 P. F. AUGUNBRAUN.